Nov. 20, 1945.    E. HAJOS    2,389,430
RESILIENT TIRE AND THE LIKE
Filed April 22, 1942
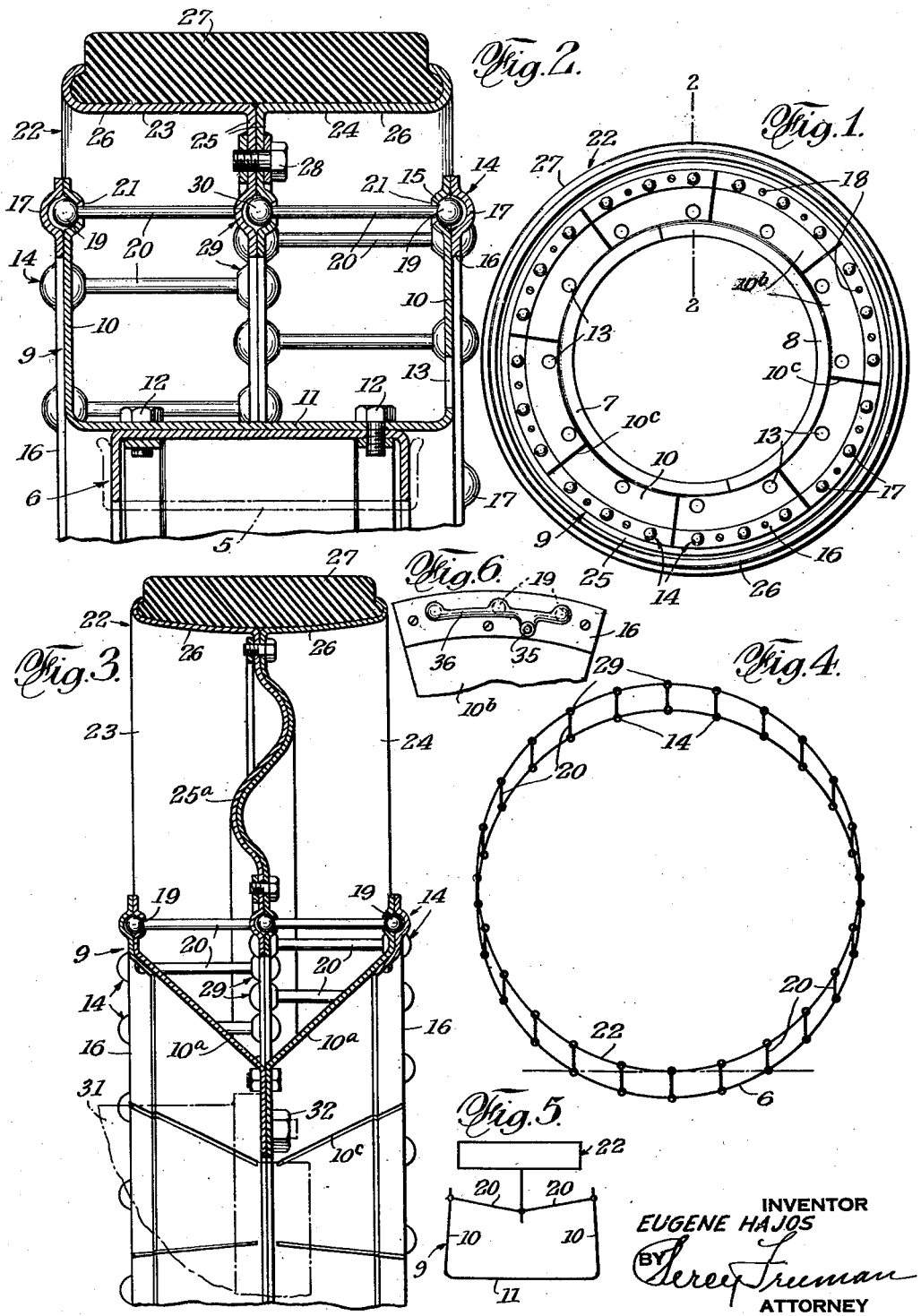
INVENTOR
EUGENE HAJOS
BY
ATTORNEY Patented Nov. 20, 1945

2,389,430

UNITED STATES PATENT OFFICE 2,389,430

RESILIENT TIRE AND THE LIKE

Eugene Hajos, Jamaica, N. Y., assignor to Ampat Corp., New York, N. Y.

Application April 22, 1942, Serial No. 439,977

6 Claims. (Cl. 152—21)

This invention relates to tires and wheels of vehicles and has for its primary object the provision of such structures which are resilient and afford cushioning in their riding properties.

Another object of the invention is to provide a tire or wheel of sturdy and durable construction and in which rubber or synthetic rubber is either sparingly used or entirely omitted.

A further object resides in the provision of a tire or wheel in which resiliency is not dependent upon spring means as such and, therefore, subject to metal fatigue, but obtained by a novel construction and arrangement of sturdy mechanical parts capable of long effective life.

A still further object is to provide a resilient tire or wheel which has effective cushioning action in its direction of travel and also is effectively cushioned against transverse displacement affording safe riding, especially on turns, of a vehicle having such tires or wheels.

The foregoing objects and other objects, features and advantages of the invention will become more clearly evident from the following detailed description of the invention. The accompanying drawing, which forms the basis of the description, illustrates two of many forms in which the invention may be realized.

In the drawing:

Fig. 1 is a side view of a tire constructed in accordance with the invention.

Fig. 2 is an enlarged cross-sectional view thereof as taken on the plane of the line 2—2 of Fig. 1.

Fig. 3 is a view similar to Fig. 2, showing a wheel structure incorporating the invention.

Fig. 4 is a diagrammatic view in which the principles of the resiliency of the present tire or wheel are disclosed.

Fig. 5 is a diagrammatic view in the plane of Fig. 2 further illustrating the principles of the present invention.

Fig. 6 is a fragmentary side view of a portion of the device showing a preferred manner of lubricating the same.

Figs. 1 and 2 show the invention as applied to a tire adapted to be mounted upon the usual felly 5 of the wheel of a vehicle.

In constructing the tire, an inner circular preferably flanged rim 6 is provided, said rim being formed in two halves 7 and 8 whereby the rim may be readily mounted upon the felly 5. Usual means such as bolts or the like may be employed for preventing relative movement of the felly and rim 6.

As contemplated herein, a circular member 9 having a saddle-like cross-section is provided, said member being provided with lateral walls 10 inter-connected by a web 11 having engagement with the rim 6 as shown and secured thereto as by means of bolts 12. Access to said bolts may be had as through openings 13 provided in the walls 10. The walls 10 may be completely circular discs but it may be desirable to provide a plurality of equally spaced slots 10<sup>c</sup> whereby springy segments 10<sup>b</sup> are formed, as best seen in Fig. 1.

The walls 10 are each provided with a plurality of preferably equally spaced seats 14 which may be formed in many ways. As shown, said seats may be formed by providing substantially semi-spherical sockets 15 in the walls 10 and arranging a ring 16 with similar sockets 17 in register therewith. The rings 16 may be secured to the walls 10 as by screws or the like 18.

Each seat 14 is fitted with the spherical end 19 of a transverse rod or bar 20 projecting through a suitable opening 21 of each of the sockets 15.

The above structure necessitates the forming of the spherical end 19 at assembly. It is evident, however, that the seats may be so formed as to permit complete forming of said rods or bars before assembly.

The tire is provided with an outer roadway-engaging rim 22 which, in the instant case, is formed of the side parts 23 and 24. Each of these parts may be formed with an inreaching wall 25, and a rim flange 26, these flanges together forming the supporting rim for a tread 27. This tread may or may not have compressibility and may be made of rubber, wood, papier mâché or any available material suitable to the purpose.

The parts 23 and 24 may be secured together as by means of bolts 28 by their walls 25 which are also formed with seats 29 similar to the seats 14 above described. In this instance, however, double the number of seats are provided, each alternate seat being aligned with respective seats in the walls 10, and receptive of spherical ends 30 of the rods or bars 20.

In the above manner, the outer or tread rim 22 is connected, through the member 9 to the inner rim 6 only by means of the rods 20. It will be evident from Figs. 2 and 4 that the axes of the inner and outer rims are capable of respective relative movement resisted by the spring action of the sides 10, and yet resist lateral or transverse displacement to some degree. It will be clear, particularly from Fig. 4, that all of the rods 20 uniformly take the load imparted on the tire and assume identical angular positions in their sockets. No elongation is contemplated in the length of the bars 20 but slight lateral flexing of the walls 10 is expected and may be provided for as described. In fact, these walls may be pre-tensioned to regulate the degree of resiliency. Only slight yielding of the walls 10 will be manifested by a considerable angular rotation of the spherical ends 19 in their seats. The foregoing is clearly evident from Fig. 5 in which the flexing of the walls 10 and the angular disposition of the rods 20 are shown when the tire or wheel is under load.

During operation of the tire above described, the bars 20 will be in continual angular motion. Hence, it is contemplated to provide lubrication in the seats 14 and 29 particularly to minimize possible wear and noise which might be generated by metal to metal contacts. For instance, as shown in Fig. 6, a pressure fitting 35 may be provided to give access to a channel 36 which communicates several rod ends 19 or 30. By applying a pressure lubricator to the fitting 35, lubricant may be forced into the channel 36 to lubricate the rod ends as can be well understood.

The above structure may be incorporated in a vehicle wheel, as shown in Fig. 3 wherein the inner rim is eliminated, the saddle-like member 9 being directly connectable to the wheel axle 31 as by the usual mounting bolts 32. With the exception of deepening the walls 25a (comparable to the walls 25) to provide a wheel disc and forming them to afford rigidity, the wheel structure may follow the tire structure of Fig. 2. In either form of the invention, the saddle-like member 9 may have either the parallel side walls 10 of Fig. 2 or the angularly disposed or dished walls 10a. The walls 10 or 10a may be treated in any manner to afford the controlled elasticity or resiliency desired.

It should be realized that this disclosure is intended as by way of example only inasmuch as many variations of the invention within the inventive concept may readily be made without departing from the spirit and scope of the appended claims.

I claim:

1. A tire structure comprising an inner rim, an intermediate unit mounted on said rim and having resilient lateral walls formed with seats, an outer tread rim having a central wall disposed between said lateral walls and formed with similar seats, and a plurality of rods having spherical ends disposed in said seats and being the sole means of support between said tread rim and said intermediate unit.

2. A tire structure comprising an inner rim, an intermediate unit mounted on said rim and having resilient lateral walls formed with seats, an outer tread rim having a central wall extending between said lateral walls and formed with similar seats, and a plurality of rods having spherical ends disposed in said seats, the respective seats in the lateral and central walls being aligned whereby said rods are arranged to transversely connect said intermediate unit with said tread rim, said rods being the sole means of interconnecting the tread rim with the walls of the intermediate unit.

3. A wheel structure comprising an axle engaged unit, resilient lateral walls on said unit formed with seats, a wheel disc disposed between said walls and formed with respectively aligned seats, a plurality of rods arranged transversely between said disc and the respective lateral walls and formed with spherical ends engaged in said seats and being the sole means of support between the resilient walls and the wheel disc, and a roadway-engaging portion on said wheel disc.

4. A tire structure or the like comprising a circular unit formed with resilient side walls, a roadway-engaging unit concentrically arranged thereto, and a plurality of transversely disposed rods connecting said units and engaged with the mentioned side walls to flex the same upon relative displacement of the axes of said units.

5. A tire structure or the like comprising a circular unit formed with side walls, a roadway-engaging unit concentrically arranged thereto, and a plurality of transversely disposed rods connecting said units and engaged with the mentioned side walls, said side walls being adapted to flex upon relative displacement of the axes of said units both in and transverse to their planes.

6. A tire structure comprising the combination with the felly of a vehicle wheel, of a U-shaped annulus removably secured to said felly, said annulus having flexible side walls composed of a plurality of sections to provide springy segments, said walls being formed with hemispherical sockets, an outer tread rim having a central inreaching web, said web having hemispherical seats or sockets corresponding to the sockets on the flexible side walls, rods having spherical ends nesting in said respective seats to yieldingly associate the tread rim with the said side walls, the tread rim being floatingly supported on the annulus solely by said interconnecting rods.

EUGENE HAJOS.